(12) United States Patent
Bonner et al.

(10) Patent No.: US 9,171,400 B2
(45) Date of Patent: Oct. 27, 2015

(54) CREATING A SURFACE FROM A PLURALITY OF 3D CURVES

(71) Applicant: Dassault Systemes, Velizy Villacoublay (FR)

(72) Inventors: David Bonner, Paris (FR); Romain Ducout, Versailles (FR)

(73) Assignee: Dassault Systemes, Velizy Villacoublay (FR)

( * ) Notice: Subject to any disclaimer, the term of this patent is extended or adjusted under 35 U.S.C. 154(b) by 225 days.

(21) Appl. No.: 13/687,502

(22) Filed: Nov. 28, 2012

(65) Prior Publication Data

US 2013/0135302 A1 May 30, 2013

(30) Foreign Application Priority Data

Nov. 29, 2011 (EP) .................................. 11306583

(51) Int. Cl.
| | | |
|---|---|---|
| G06T 17/00 | (2006.01) | |
| G06T 17/20 | (2006.01) | |
| G06T 17/30 | (2006.01) | |

(52) U.S. Cl.
CPC ................. *G06T 17/00* (2013.01); *G06T 17/20* (2013.01); *G06T 17/30* (2013.01)

(58) Field of Classification Search
CPC ......... G06T 17/20; G06T 19/00; G06T 17/00; G06T 19/20; G06T 2219/2021; G06T 17/30; G06T 17/205; G06T 2200/04
USPC .......... 345/419, 420, 423, 619, 424, 441, 442
See application file for complete search history.

(56) References Cited

U.S. PATENT DOCUMENTS

| | | | | |
|---|---|---|---|---|
| 5,341,461 A | * | 8/1994 | Kikuchi et al. | ............... 345/420 |
| 5,371,845 A | * | 12/1994 | Newell et al. | .................. 715/808 |
| 6,639,592 B1 | | 10/2003 | Daynand et al. | |
| 6,856,312 B1 | * | 2/2005 | Imai et al. | ..................... 345/419 |
| 7,400,323 B2 | | 7/2008 | Nigro | |
| 7,595,799 B2 | | 9/2009 | Nigro | |
| 7,742,629 B2 | * | 6/2010 | Zarkh et al. | .................... 382/128 |
| 2008/0303810 A1 | * | 12/2008 | Bae et al. | ..................... 345/419 |
| 2013/0127836 A1 | * | 5/2013 | Joshi et al. | .................... 345/419 |
| 2013/0127857 A1 | * | 5/2013 | Carr et al. | ..................... 345/423 |

FOREIGN PATENT DOCUMENTS

EP 2600315 A1 6/2013

OTHER PUBLICATIONS

European Search Report from EP Application No. 11 30 6583 dated Jun. 7, 2012.

(Continued)

*Primary Examiner* — Carlos Perromat
(74) *Attorney, Agent, or Firm* — Hamilton, Brook, Smith & Reynolds, P.C.

(57) ABSTRACT

It is provided a computer-implemented method for creating a surface from a plurality of 3D curves. The method comprises providing a plurality of 3D curves, determining crossings between pairs of the curves, defining a base graph comprising nodes representing the crossings and arcs connecting pairs of nodes representing crossings that are neighbors, determining, from the graph, a mesh comprising vertices defined by a 3D position and edges connecting pairs of the vertices, and fitting the mesh with a surface. Such a method makes the creation of a surface from a plurality of 3D curves easier.

11 Claims, 6 Drawing Sheets

(56) References Cited

OTHER PUBLICATIONS

Abbasinejad, F., et al. "Surface Patches from Unorganized Space Curves" Eurographics Symposium on Geometry Processing, 30:5, Jul. 20, 2011.

Morigi, S., et al. "Reconstructing Surfaces from Sketched 3D Irregular Curve Networks" Eurographics Symposium on Sketch-Based Interfaces and Modeling, pp. 39-46, Aug. 7, 2011.

Nealan, A., et al. "FiberMesh: Designing Freeform Surfaces with 3D Curves" ACM Transactions on Graphics, 26(3):41 pp. 41-1-41-9, Jul. 2007.

Zorin, D., et al. "Interactive Multiresolution Mesh Editing" Computer Graphics Proceedings, Siggraph 97 Los Angeles, pp. 259-268 Aug. 3-8, 1997.

Nishita, T., et al. "A Scan Line Algorithm for Rendering Curved Tubular Objects" Computer Graphics and Applications, Proceedings $7^{th}$ Pacific Conference Seoul, South Korea, pp. 92-101 and 319, Oct. 5, 1999.

Bae, S.H., et al. "ILOVESKETCH: As-Natural-As-Possible Sketching System for Creating 3D Curve Models", Department of Computer Science, University of Toronto, Oct. 19-22, 2008. Retrieved from Internet on Dec. 5, 2012.

Bae, S.H., et al. "EverybodyLovesSketch: 3D Sketching for a Broader Audience", Department of Computer Science, University of Toronto, Oct. 4-7, 2009. Retrieved from Internet on Dec. 5, 2012.

Farin, G. and Hansford, D. "Discrete Coons Patches", Computer Aided Geometric Design 16 pp. 691-700, received Nov. 1998, revised Apr. 1999. Retrieved from Internet on Dec. 5, 2012.

Levin, A. "Interpolating Nets of Curves By Smooth Subdivision Surfaces", www.graphicon.ru/oldgr/library/siggraph/99/papers/levin/levin.pdf; Retrieved from Internet on Dec. 5, 2012.

Litke, N, at al. "Fitting Subdivision Surfaces" citeseerx.ist.psu.edu/viewdoc/download Retrieved from Internet on Dec. 5, 2012.

Bommes, et al., "Integer-Grid Maps for Reliable Quad Meshing", *ACM Trans. on Graphics, Proc. SIGGRAPH*, 32(4):1-12, (2013).

Calakli, et al., "SSD: Smooth Signed Distance Surface Reconstruction", *Pacific Graphics*, 30(7): 1-11, (2011).

Chang, W. Y., "Surface Reconstruction from Points", *UCSD CSE Technical Report CS2008-0922*, (http://www.cs.ubc.ca/~wychang1/papers/fa06wychang.pdf) (2007).

European Search Report, EP 14 30 5529, "Creating a surface from a plurality of 3D curves", dated Jun. 5, 2014.

Hornung, et al., "Robust reconstruction of watertight 3D models from non-uniformly sampled point clouds without normal information", *Eurographics Symposium on Geometry Processing*, (2006).

Kalogerakis, et al., "Robust statistical estimation of curvature on discretized surfaces", *Eurographics Symposium on Geometry Processing*, (2007).

Kazhdan, et al., "Reconstruction of Solid Models from Oriented Point Sets", *Eurographics Symposium on Geometry Processing*, (2005).

Kazhdan, et al., Poisson Surface Reconstruction, *Eurographics Symposium on Geometry Processing*, (2006).

Kennedy, et al., "Particle Swarm Optimization", *Proceedings of the IEEE International Conference on Neural Networks*, pp. 1942-1948 (1995).

Lorensen, et al., "Marching Cubes: A High Resolution 3D Surface Construction Algorithm", *Computer Graphics*, 21(4):163-169 (1987).

Muraki, S., Volumetric Shape Description of Range Data using 'Blobby Model', *Proceedings of ACM SIGGRAPH 1991 Conference, Computer Graphics*, 25(4):227-235 (1991).

Tosun, et al., "Shape Optimization Using Reflection Lines", *Eurographics Symposium on Geometry Processing*, (2007).

Wang, W., "Computation of Rotation Minimizing Frames", *ACM Transactions on Graphics*, 27(1):2.1-2.18 (2008).

\* cited by examiner

CREATING A SURFACE FROM A PLURALITY OF 3D CURVES

RELATED APPLICATION

This application claims priority under 35 U.S.C. §119 or 365 to European Application No. 11306583.3, filed Nov. 29, 2011.

The entire teachings of the above application(s) are incorporated herein by reference.

FIELD OF THE INVENTION

The invention relates to the field of computer programs and systems, and more specifically to a method, system and program for creating a surface from a plurality of 3D curves.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such systems, the graphical user interface (GUI) plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise.

The PLM solutions provided by Dassault Systemes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Some of these systems allow creating a surface from a plurality of 3D curves, which falls in the general category of geometric modeling and more precisely surface design. An introductory publication is: "Geometric Modeling", 3rd Edition, by Michael E. Mortenson, Industrial Press, May, 2006. Of particular interest are composite surfaces (a quilt of one or many surfaces), of any type, in particular quilts of curved surfaces, triangle-mesh surfaces (composed of flat facets), or subdivision surfaces.

A B-Rep (Boundary Representation) is a mathematical model that shall be mentioned here because it groups all the above mentioned surfaces into a single concept. A B-Rep aggregates one or more functions $f_i(s, t) \rightarrow (x, y, z)$ with domain in $R^2$ and range in $R^3$, and logical information as to how these individual pieces are "sewn" together. The sewing can be such that the surfaces are "trimmed" which means that the $R^2$ domain of each function is not used in its entirety. How best to generate such a patchwork of surfaces from sets of curves is a traditional problem in geometric modeling. In the special case of triangle mesh, each individual surface element is a flat facet, in other words a plane. A widely known definition of a B-Rep is STEP AP203. This is the standard that CATIA V5 and CATIA V6 apply when exporting a CATPart as a .stp file. B-Reps can be open, in which case they do not enclose a volume, or closed, in which case they describe the frontier of a volume and as such may represent a solid object. In the STEP AP203, they are referred to by the keywords OPEN_SHELL and CLOSED_SHELL respectively. The term B-Rep may however be used in a wider sense than the AP203 norm. In AP203, the case of the open B-Rep is just called an open shell, with the term B-Rep (in keyword "ADVANCED_BREP_SHAPE_REPRESENTATION") being reserved to the closed shell case. A B-Rep that does not enclose a volume is often referred to as a surface (in the singular form), even when composed of many sub-functions. This is especially the case when the junctions between the sub-pieces are smooth, masking to the user the composite nature of the object. Engineers or stylists frequently speak of the composite shapes generated as a single surface.

To facilitate construction of 3D models, in particular freeform shapes, some CAD systems provide diverse methods for generating a B-Rep (or portion thereof) from a set of lower dimensional inputs. These inputs might be a set of points at regular intervals, a set of points and tangent planes, a profile and an extrusion direction, a combination of sweep profiles and sweep rails, a set of curves to interpolate. In the case of sets of curves, these are generally required to be perfectly intersecting or to be sequenced. For example, the NET surface of CATIA V5/6 creates surfaces from a grid of intersecting curves.

A variety of functions that map from $R^2$ into $R^3$ can be used to form a B-Rep. These can go from simple planes (as in a triangle mesh) to very high order polynomials, and including also canonic surfaces such as the cylinder. It is also possible to make use of a Catmull-Clark Subdivision Surface integrated e.g. to CATIA, as described in U.S. Pat. Nos. 7,595,799 and 7,400,323. In these systems, the Subdivision Surface is first converted to a triangle mesh, for real-time visualization, and then converted to B-Spline surfaces for definitive high-quality result.

Also worth mentioning is Computer-Aided Curve Sketching. Creation of surfaces from curves is best used in a context where curves can be created quickly and easily. Curve sketching is a rich field of research in computer graphics. The publication entitled "ILoveSketch: As-natural-as-possible sketching system for creating 3D curve models," ACM Symposium on User Interface Software and Technology 2008, Monterey, Calif., USA, Oct. 19-22, 2008, and the publication entitled "EverybodyLovesSketch: 3D Sketching for a Broader Audience," Seok-Hyung Bae, Ravin Balakrishnan, and Karan Singh, Proceedings of ACM Symposium on User Interface Software and Technology 2009 (Victoria, BC, Canada, Oct. 4-7, 2009, pp. 59-68, present curve sketching. These two publications deal with networks of curves that define a shape, but do not propose to dress the shape with a surface, because of the difficulty of this operation.

One problem of the existing solutions for creating a surface from a plurality of 3D curves is the little flexibility given to the artist or engineer in shape definition. Existing solutions do not allow unconstrained design actions. Typically, they do not satisfy a highly creative artist user who is (rightly) impatient with any inflexibility of the computer system when putting new ideas down to the drawing board. They do not allow for trial and error and very interactive modification of the shape. They are not usable by any person involved in the product design, but just by the product design artists. A system which is usable by any person involved in the product design would be helpful because all might exchange ideas, and are thus subject to the same constraint of instant creation as the artist.

Methods in prior art that construct surfaces from curves fall into two categories: sweep/loft type methods, and net surfaces (net as in network).

Sweep/loft methods require the separation of curves into different categories; typically one curve will be the guide, and the others will be sectional shapes, or maybe the sectional shapes will be given and no guide. In all of these cases, the inputs must be carefully organized and the resulting surface is not truly free-form but rather a flowing shape that is oriented in a given direction (from one section to the next, or along the guide curve). Sweeping and lofting are very useful, and used intensively in CAD systems, but it is not applicable to truly free-form sketching of 3D shapes, because it requires a detailed view of the shape that is to be obtained, and thus does not support an open ended, trial and error type approach.

Network surfaces (net for short) are a family of techniques of which the best known is the Coons surface. A good discussion of the Coons surface can be found in the article "Discrete Coons Patches" Farin & Hansford, Computer Aided Geometric Design 16 (1999) 691-700. Many other types of net surfaces exist, including the CATIA net surface mentioned above, or the method described in a publication that addresses how to fit subdivision surfaces to curves ("Interpolating Nets of Curves by Smooth Subdivision Surfaces", Levin, Siggraph 99), which is based on defining a particular subdivision scheme that converges to the curves. Net surfaces all have in common that they interpolate a network of curves. Because the surface goes through the curves, the curves must intersect each other, forming a grid with closed loops. This is a showstopper condition for most artistic work, since it is practically impossible to sketch freely in 3D a set of curves such that they touch each other.

Also worth mentioning is a reference for fitting, which is the publication entitled "fitting subdivision surfaces", by Litke, Levin and Schroder, Siggraph 2001. The method described in this paper works on a general target (all points have target locations they should attain).

Within this context, there is still a need for an improved solution for creating a surface from a plurality of 3D curves.

SUMMARY OF THE INVENTION

According to one aspect, it is therefore provided a computer-implemented method for creating a surface from a plurality of 3D curves. The method comprises providing a plurality of 3D curves, determining crossings between pairs of the curves, defining a base graph comprising nodes representing the crossings and arcs connecting pairs of nodes representing crossings that are neighbors, determining, from the graph, a mesh comprising vertices defined by a 3D position and edges connecting pairs of the vertices, and fitting the mesh with a surface.

The method may comprise one or more of the following:
  determining the crossings includes determining at least one crossing between a respective pair of the curves as a pair of points, each belonging to a different one of the respective pair of the curves;
  the method comprises projecting the plurality of 3D curves on a support, thereby obtaining a plurality of corresponding projected curves, determining crossings between pairs of the projected curves, and retrieving the pairs of points of the curves corresponding to the crossings between pairs of the projected curves;
  projecting the plurality of 3D curves on a support comprises discretizing the plurality of 3D curves into polylines consisting in a set of segments, and, projecting the segments on the support, thereby obtaining a plurality of corresponding projected segments; and determining crossings between pairs of the projected curves comprises determining pairs of the projected segments corresponding to different curves belonging to a same voxel, determining bi-perpendiculars between the determined pairs of projected segments, and, determining the extremities of the bi-perpendiculars;
  determining the mesh comprises adding arcs and/or nodes to the graph, until all tiles of the graph are divided into faces having three or four arcs;
  determining the mesh comprises adding arcs and/or nodes to the graph, until no T-joint remains;
  determining the mesh comprises adding arcs and/or nodes to the graph according to a mesh subdivision scheme;
  the crossings include at least one crossing between a respective pair of the curves determined as a pair of points, each belonging to a different one of the respective pair of the curves, and wherein determining the mesh comprises associating to the node representing the at least one crossing the 3D position of the middle of the pair of points;
  determining the mesh comprises adding nodes to the graph, and associating, to a given added node, a 3D position which depends on the topological position of the given node relative to the graph before adding nodes;
  the 3D position associated to a given added node is, if the topological position of the given added node is on an arc of the graph before adding nodes, a position computed by offsetting the curve represented by the arc according to the 3D positions associated to the nodes at the extremities of the arc, or, if the topological position of the node is on the interior of a tile of the graph before adding nodes to the graph which is four-sided, a position computed by the Coons method, or, in any other case, a position computed by averaging 3D positions of neighbors;
  the plurality of 3D curves comprises curves that are sketched free-hand.

It is further proposed a CAD system comprising at least one memory having recorded thereon instructions for performing the above method, at least one processor coupled with the memory, and at least one graphical user interface coupled with the processor and suitable for execution of the instructions.

It is further proposed a computer program comprising instructions for performing the above method.

It is further proposed a computer readable storage medium having recorded thereon the above computer program.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
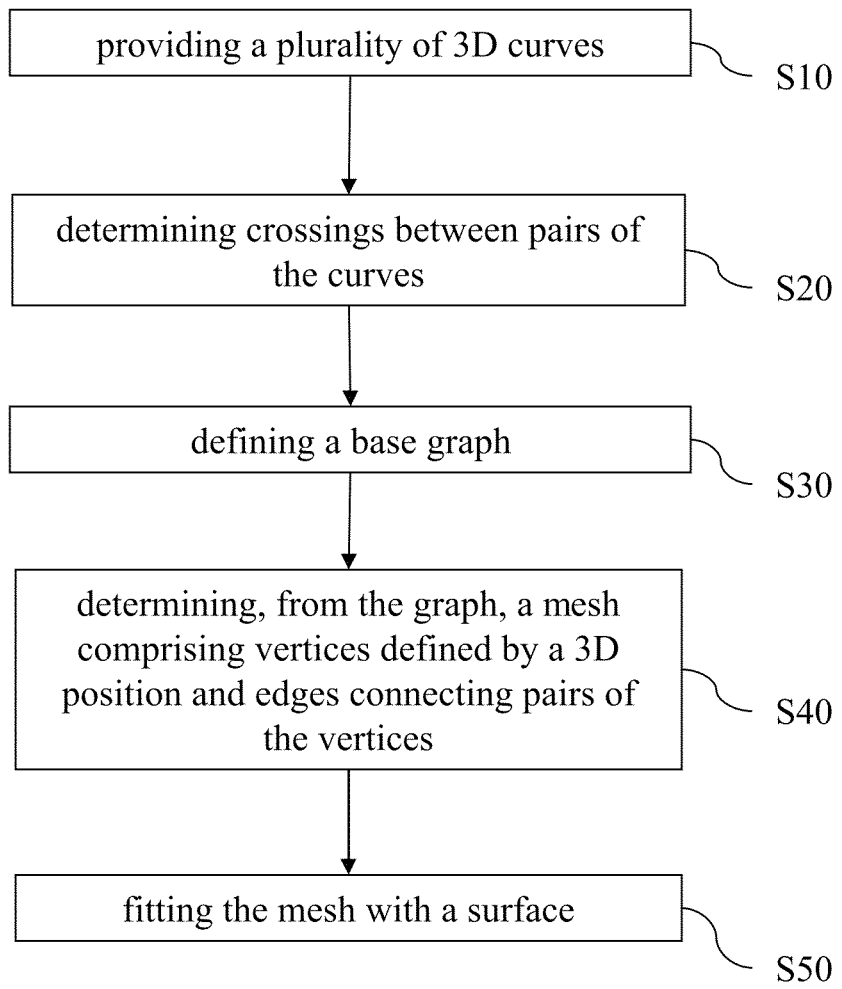
FIG. 1 shows a flowchart of an example of the method.

FIG. 1 shows a flowchart of an example of a computer-implemented method for creating a surface from a plurality of 3D curves. The method comprises providing (S10) a plurality of 3D curves, determining (S20) crossings between pairs of the curves, and defining (S30) a base graph. The base graph comprises nodes, that represent the crossings, and arcs, that connect pairs of nodes representing crossings that are neighbors. The method also comprises determining (S40), from the graph, a mesh comprising vertices defined by a 3D position and edges connecting pairs of the vertices. The method then comprises fitting (S50) the mesh with a surface. Such a method improves the creation of a surface from a plurality of 3D curves.

The method may be comprised in a process of designing a CAD modeled object. "Designing a CAD modeled object" designates any action or series of actions which is at least part of a process of elaborating a CAD modeled object. Thus, the method may comprise creating the CAD modeled object from scratch. Alternatively, the method may comprise providing a CAD modeled object previously created, and then modifying the CAD modeled object. In any case, the surface created by the method may represent the CAD modeled object or at least part of it, e.g. a boundary of the CAD modeled object. Because the method makes the creation of a surface from a plurality of 3D curves easier, the method also makes the design of a CAD modeled object easier.

A modeled object is any object defined by data stored in a memory of a CAD system. By extension, the expression "modeled object" designates the data itself. According to the type of the system, the modeled objects may be defined by different kinds of data. A CAD system is any system suitable at least for designing a modeled object on the basis of a graphical representation of the modeled object, such as CATIA. Thus, the data defining a CAD modeled object comprise data allowing the representation of the modeled object (e.g. geometric data, for example including relative positions in space). A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file may contain specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

The method may be included in a manufacturing process, which may comprise, after performing the method, producing a physical product corresponding to the CAD modeled object. In any case, the surface which is created from a plurality of 3D curves by the method may represent a manufacturing object, e.g. the boundary of such object. The manufacturing object may be a product, such as a part, or an assembly of parts. Because the method makes the design easier, the method also makes the manufacturing of a product faster and thus increases productivity of the manufacturing process.

The method is computer-implemented. This means that the method is executed on at least one computer, or any system alike. Unless mentioned otherwise, all steps of the method are performed by the computer, i.e. without intervention of the user. For example, the steps of determining (S20), defining (S30), determining (S40) and then fitting (S50) may be performed by the sole computer, whereas the step of providing (S10) a plurality of 3D curves may be performed through user-interaction. Thus, the user may intervene for providing (S10) a plurality of 3D curves, and the method may then perform automatically. The method thereby allows the automatic creation of a surface from a plurality of 3D curves through the steps of determining (S20), defining (S30), determining (S40) and then fitting (S50), which will be discussed later. It is also worth mentioning that some of these steps of the method may allow intervention of the user. For example, although the determining (S20), defining (S30), determining (S40) and then fitting (S50) may be performed automatically by the sole computer, as will be discussed later, the user may intervene (e.g. to modify the result of the algorithm run by the computer, for example modify the base graph that has been defined at (S30)).

A typical example of computer-implementation of the method is to perform the method with a CAD system comprising a graphical user interface (GUI) suitable for this purpose. The CAD system comprises hardware and the GUI is suitable for performing the method without installing any software. In other words, software is already ready on (or coupled with) the GUI for immediate use. In other words, the system comprises instructions coded on a memory coupled to the processor, the instructions providing means for performing the method. Such a system is a tool with which the creation of a surface from a plurality of 3D curves is easy. Such a system may thus be used by a wide array of users, including specialist designers who typically are creative artist users and who are not familiar with complex CAD systems.

The system may also be a CAE and/or CAM system, and the CAD modeled object may also be a CAE modeled object and/or a CAM modeled object. Indeed, CAD, CAE and CAM systems are not exclusive one of the other, as a modeled object may be defined by data corresponding to any combination of these systems.

As the curves are 3D (i.e. three-dimensional), the surface created by the method may also be 3D. This means that the surface is defined by data allowing its 3D representation. A 3D representation allows the viewing of the represented surface from all angles. For example, a 3D surface, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D curves and the created surface may be parametric. This ensures that the surface is ready for use as an input in a wide array of CAD operations. A parametric shape (curve or surface) is a shape that is modeled by at least one function of at least one parameter (i.e. such function is stored in the memory of the system). The function may provide the position of points of the shape. For example, a 3D parametric curve may be modeled by a function $C(u)=(x(u), y(u), z(u))$ and a 3D parametric surface may be modeled by a function $S(u,v)=(x(u,v), y(u,v), z(u,v))$, e.g. a NURBS. In the field of CAD, modeling elements of a CAD modeled object such as curves or surfaces with parametric functions allows for performing CAD operations on the shapes. Indeed, the CAD operations of most CAD systems are not performable on a simple pixel map which is a representation of an object. In other words, most CAD operations of CAD systems need the parametric function as an input to be executed.

Figure 2:
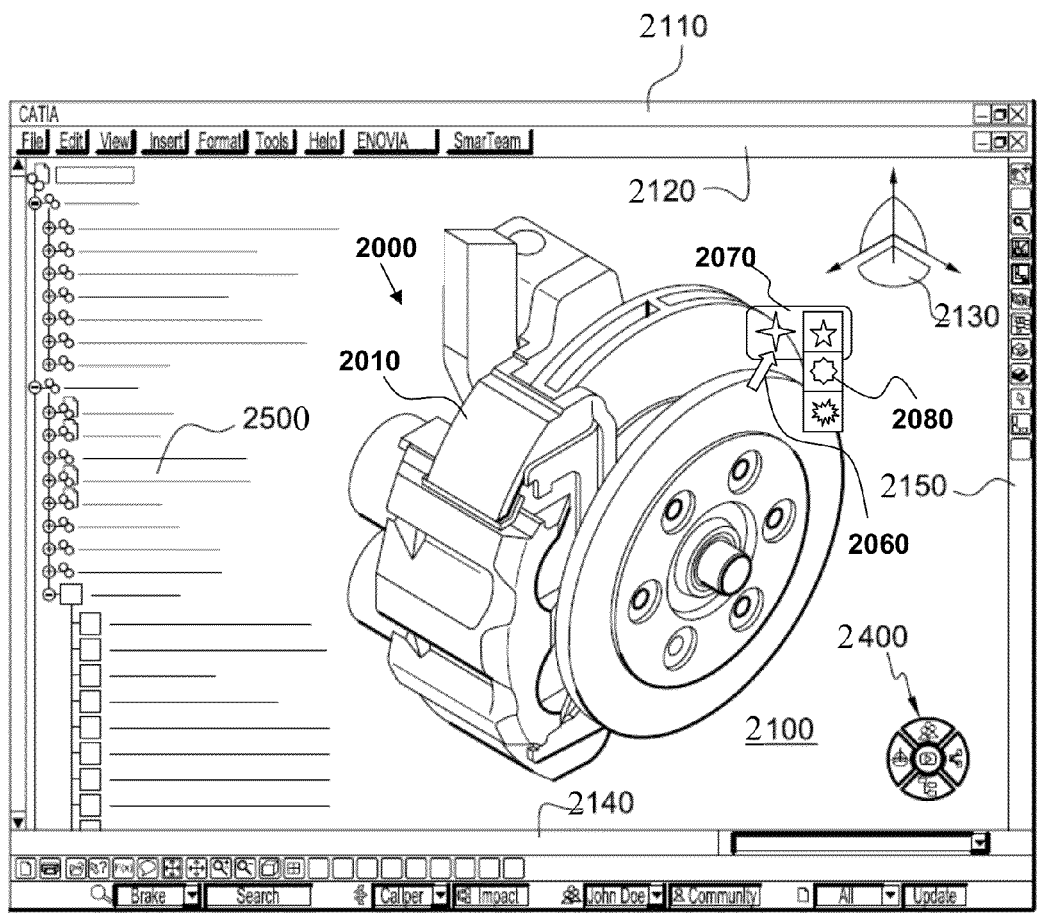
FIG. 2 shows an example of a graphical user interface.

FIG. 2 shows an example of the GUI of a typical CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen.

The GUI may for example display data 2500 related to the displayed product 2000. In the example of FIG. 2, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 3:
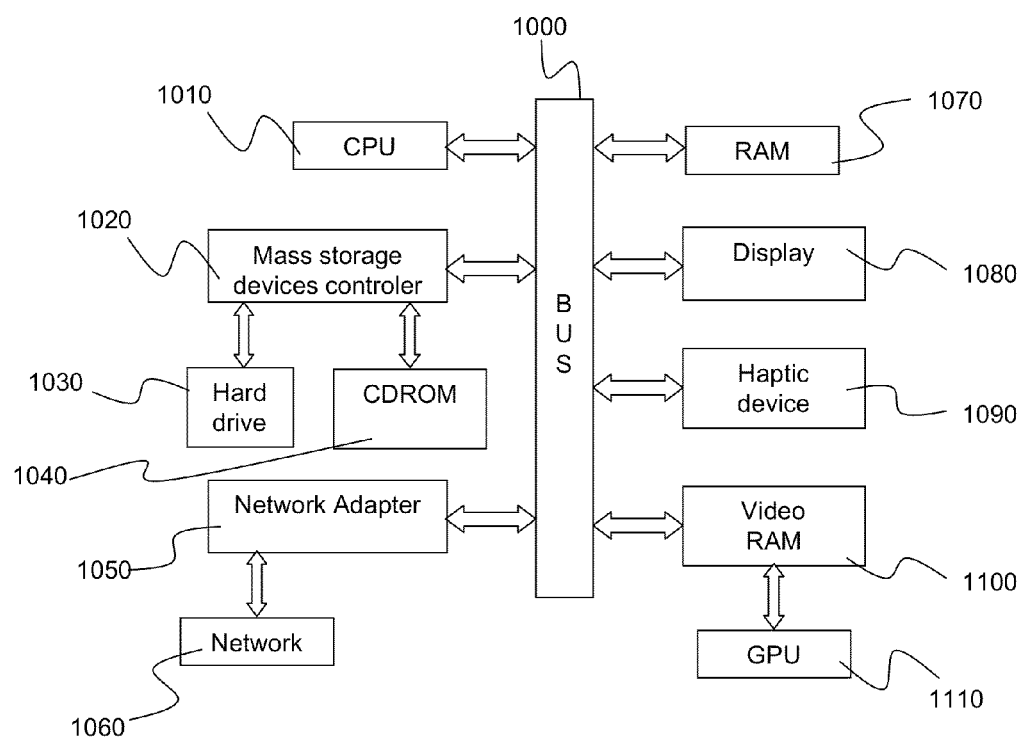
FIG. 3 shows an example of a client computer system.

FIG. 3 shows an example of the architecture of the system as a client computer system, e.g. a workstation of a user.

The client computer comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on screen 1080, as mentioned with reference to FIG. 2. By screen, it is meant any support on which displaying may be performed, such as a computer monitor. In addition, the cursor control device allows the user to select various commands, and input control signals. The cursor control device includes a number of signal generation devices for input control signals to system. Typically, a cursor control device may be a mouse, the button of the mouse being used to generate the signals.

To cause the system to perform the method, it is provided a computer program comprising instructions for execution by a computer, the instructions comprising means for this purpose. The program may for example be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The instructions may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language. The program may be a full installation program, or an update program. In the latter case, the program updates an existing CAD system to a state wherein the system is suitable for performing the method.

The method comprises providing (S10) a plurality of 3D curves. For example, the plurality of 3D curves may be provided by a user. For example, the plurality of 3D curves comprises curves that are sketched free-hand. Sketching curves free-hand means that the user draws strokes that are translated into curves, which may be parametric. The strokes may be drawn on the screen directly, if the screen is a sensitive screen for example, or on a sensitive tab. This makes the creation of the surface easy and intuitive to designers who are used to sketching designs on paper, such as specialist designers.

The method also comprises determining (S20) crossings between pairs of the curves. A crossing between a given pair of the curves is an indication of a zone where the given pair of the curves are particularly close to each other. By "close to each other", it is meant that the distance between the two curves of the given pair is below a predetermined threshold. By "particularly" close to each other, it is meant that the distance between the two curves at the crossing is smaller than for other zones of the curves. A crossing between two curves may be an intersection between the two curves. However, as the curves may be provided by the user, there is a high probability that the curves usually do not exactly intersect each other, although the user meant to make them intersect. The crossings are thus an extension of the classic intersections and capture the willingness of a user to make the curves intersect. In an example, determining (S20) the crossings includes determining at least one crossing between a respective pair of the curves as a pair of points, each belonging to a different one of the respective pair of the curves. In other words, at least one crossing is not an exact intersection. The method thus captures intended intersections between the curves, although the curves do not intersect perfectly. This offers a high flexibility at a time of defining the curves prior to providing (S10) them.

The method then comprises defining (S30) a base graph (i.e. an initial graph). The base graph comprises nodes, that represent the crossings, and arcs, that connect pairs of nodes representing crossings that are neighbors. Two crossings are considered to be neighbors if they are associated to a same curve and there is no other crossing between them.

The method then comprises determining (S40), from the graph, a mesh comprising vertices defined by a 3D position and edges connecting pairs of the vertices. A mesh is a particular kind of graph widely used in CAD. A mesh is a graph that has a 3D position associated to each node (called "vertex" in case of the mesh, whereas arcs are called "edges"). The method finally comprises fitting (S50) the mesh with a surface.

Indeed, in CAD, meshes are widely used to create surfaces by fitting the meshes with surfaces. The method may apply any existing module of CAD systems for fitting meshes with a surface. The fitting surfaces may be subdivision surfaces, or NURBS. Such surfaces are parametric and allow ulterior use of the surface beyond their simple representation. Notably, when the surface to be created represents products, such as a part or an assembly of part, subdivision surfaces offer the high level of geometric precision required for such modeled objects.

The method thereby allows the fitting of a surface to a set of curves that do not intersect in 3D, thanks to the use of the notion of crossings. In contrast with prior art methods that require curves to touch each other, there is an enormous advantage to allowing an artist to draw curves in 3D without concern about their exact intersections.

Furthermore, the method may be fully automatic, once the curves are provided. Therefore, the user need not indicate any guiding curve or such. The method evaluates crossings, defines a graph from the crossings, and then fits the graph with a surface via creating a mesh from the graph. As the mesh is created from the graph, it is ensured that the user-intent is respected (i.e. the created surface represents the provided curves).

Figure 4:
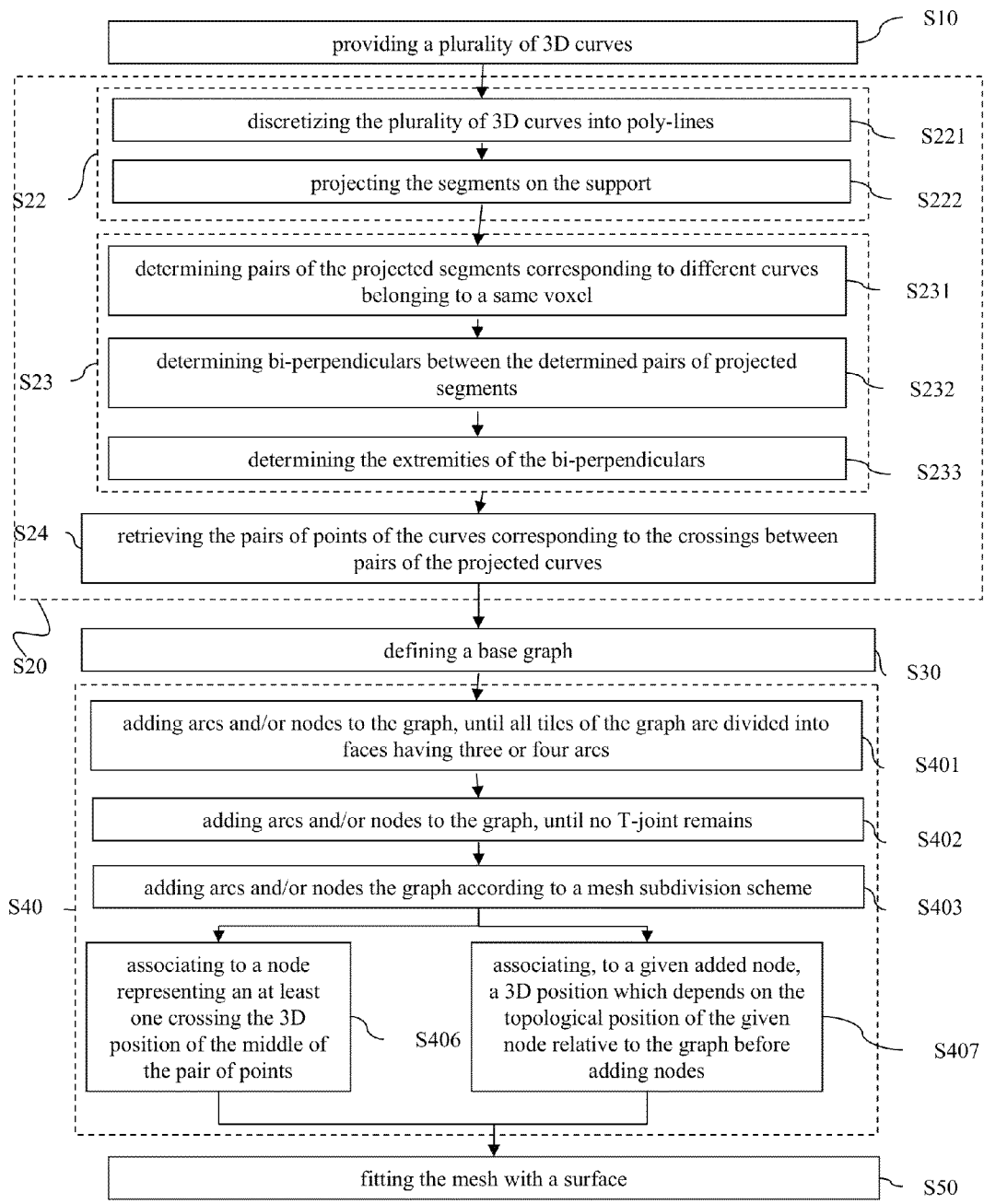
FIG. 4 shows a flowchart of an example of the method.

Examples of the method will now be described with reference to FIGS. 4-14. FIG. 4 shows a flowchart of an example of the method. FIGS. 5-14 illustrate examples of the steps of the method of FIG. 4.

In this example, the method comprises projecting (S22) the plurality of 3D curves on a support. The support is a 3D shape (surface or volume) that (e.g. roughly) represents the form of the surface that the user wants to create. Thereby, a plurality of corresponding projected curves is obtained. The method in the example then comprises determining (S23) crossings between pairs of the projected curves. Finally, the method comprises retrieving (S24) the pairs of points of the curves corresponding to the crossings between pairs of the projected curves. In other words, the crossings between the 3D curves are determined (S20) to be corresponding to crossings between projections of the 3D curves. Thus, in this example, the determining (S20) of the crossings is performed via the support, which allows a better control as to where the crossings should be detected.

Figure 5:
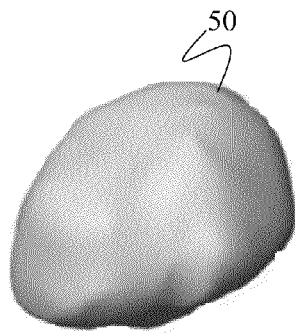
FIGS. 5-14 show schematically examples of the method.
Figure 6:
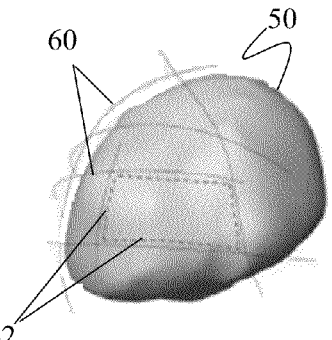
Figure 7:
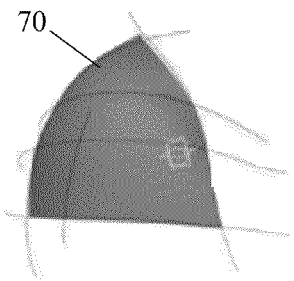
Figure 8:
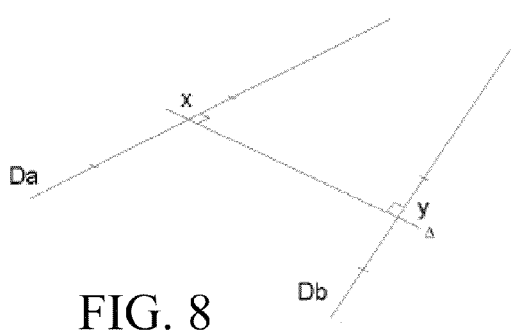
Figure 9:
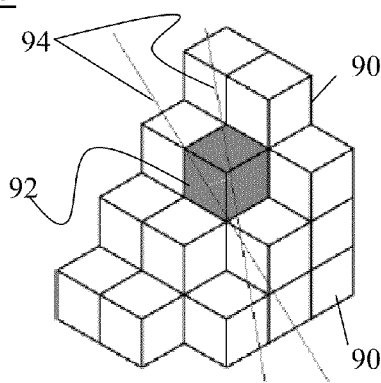
Figure 10:
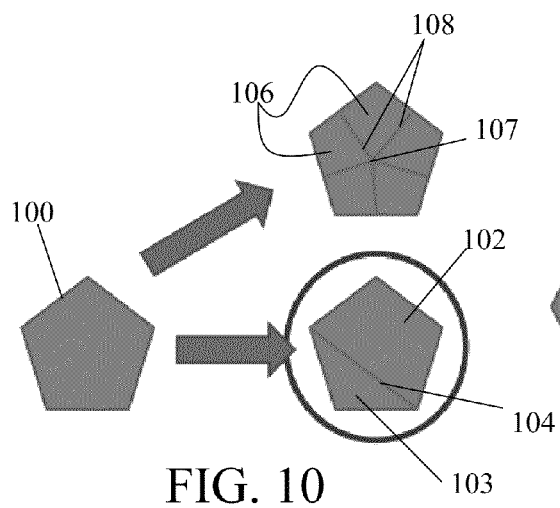
Figure 11:
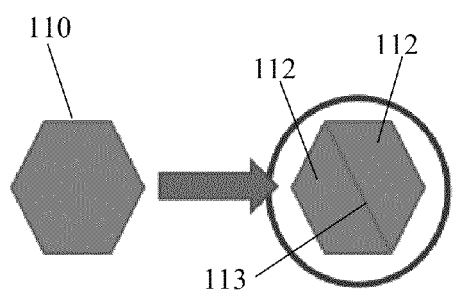

Indeed, the support serves as an indicator shape. With reference to FIGS. 5-7, the user may create or select from catalog such an initial indicator shape 50 (i.e. the support). Indeed, as an optional preprocessing step, an indicator shape can be used. Before drawing the 3D curves, the user first creates a rough initial shape with any rapid method for constructing 3D shapes, it is possible also to retrieve the shape from a catalog. Volumetric clay-modeling software may be used for the purpose of making the indicator shape. Then the user draws the curves in 3D around the indicator shape, or even on the indicator shape itself, using the shape effectively as a blackboard. The user may thus create the curves 62, which are projected on the indicator shape 50. The surface 70 may eventually be automatically generated and updated by the method, notably after determining crossings between the curves via their projections 62 (noted as dotted lines on the indicator shape 50 on FIG. 6). The subsequent surface 70 construction may depend only on the curves 62. If used, the indicator shape 50 may serve to assist in detecting the curve crossings. It has been found that the indicator shape allows a more stable detection of crossings and is thus beneficial. In this way the user has more control over how the curves intersect each other.

Projecting (S22) the plurality of 3D curves on the support may comprise discretizing (S221) (i.e. sampling) the plurality of 3D curves into poly-lines. A poly-line is, as widely known, a set of segments. The projecting (S22) may then comprise projecting (S222) the segments on the support. Thereby, a plurality of corresponding projected segments (i.e. projections of the segments) is obtained. At this point, the 3D curves are represented as the projections of poly-lines originating from the discretization of the 3D curves. The support may comprise facets (planes) and the projection of the poly-lines may thus be poly-lines themselves. In other words, the projections of the segments of the poly-lines, i.e. the "projected segments", may be segments as well. Also, determining (S23) crossings between pairs of the projected curves may comprise determining (S231) pairs of the projected segments corresponding to different curves belonging to a same voxel, then determining (S232) bi-perpendiculars between the determined pairs of projected segments, and finally determining (S233) the extremities of the bi-perpendiculars. This way of proceeding allows a fast determining (S20) of the crossings.

When a user sketches 3D curves, they usually never exactly intersect each other and the algorithm has to estimate these intersections (via the notion of crossings), trying to figure out what the designer wishes to represent. The method of the example transforms each curve into poly-line form (many small segments) to reduce the cost of the proximity computation, and projects the segments on the support for searching for crossings between them. The method then searches for crossings between segments by computing the unique line that intersects both segments and which is perpendicular to both of them (the bi-perpendicular), as illustrated on FIG. 8 for two projected segments Da and Db. If the 2 intersection points (x and y on FIG. 8) are on the segments Da and Db and the distance between them is inferior to a threshold, then the method may interpret it as if the 2 segments intersect each other (in other words, a crossing is determined). The method may save the crossing described by the points x and y on the two curves. In order to reduce the time cost of this test, as illustrated on FIG. 9, the method may use voxels. If this is the case, the method may divide the space in a grid of cubes 90 and only segments 94 that are inside of the same cube 92 will be tested (as to whether there is a crossing between them).

In the example, determining (S40) the mesh comprises adding (S401) arcs and/or nodes to the graph, until all tiles of the graph are divided into faces having three or four arcs. The mesh to be determined (S40) may be a triangular mesh or a quad mesh (having respectively three or four edges per face). A quad mesh provides a high quality of the final surface. The adding (S401) allows the reduction of the number of edges per face in the case the graph is "irregular" and not directly ready for becoming a mesh. Once the graph has tiles (i.e. loops) that have only three or four arcs, it is closer to becoming a triangular or quad mesh.

Once the crossings are determined (S20), the method creates a graph that indicates for each crossing the neighboring ones. Two crossings are neighbors if they are on the same curve with no other intersection in between. From this graph, a first intermediary mesh is generated. With a recursive algorithm, the method detects cycles in the graph that are interpreted as a tile in the graph. A tile is a face of the graph with 3 to 6 sides. Thus, at this point, the mesh is composed of tiles but they are divided so that the method can convert this intern mesh into an underlying model such as subdivision meshes. In the following, a non divided tile will be called "base tile". For each divided tile, the method keeps information about which base tile was split to make the divided tile.

Potentially, tiles can have other than 3 to 6 sides, but it will be clear in what follows that a splitting scheme can be devised for any number of sides. Indeed, it has been found that one of the best possible strategies for covering the 3 to 6 side range is what counts, as the other cases are rare and not very useful for a designer. Thus, the method of the example first cuts hexagons and pentagons into triangles or quads. As shown on FIG. 10, a pentagon 100 may be split in one quad 102 and one triangle 103 by adding one edge 104 or in five quads 106 by adding one vertex 107 and five edges 108. As shown on FIG. 11, a hexagon 110 may be split in two quads 112 by adding one edge 113.

In the method of the example, determining (S40) the mesh further comprises adding (S402) arcs and/or nodes to the graph, until no T-joint remains. A T-Joint occurs when a curve crosses (i.e. has a crossing with) another, and then terminates. If the place where the curve ends is not the outer edge of the surface, a T joint is created in the mesh. T-joints are not always acceptable in the underlying surface model. One of the goals of the method of the example is to remain perfectly general and support all kinds of surface models. For that, the method provides a mode whereby the method propagates all cuts across the network, effectively eliminating the T-joint. This allows a higher quality of the surface in the end.

This may be done as the last step of the generation of the topology, when the mesh contains only quads and triangles. An algorithm for that may be to propagate T joints on the edge at the other side until the algorithm can loop on it, or, when the algorithm reaches a limit of the surface, when the T joint is no longer a problem. In order to avoid infinite loop in the algorithm, the method may stop the propagation if the algorithm reaches again the initial base tile.

However, in another example the method may implement a T-jointed surface model, such as T-Splines. In such a case, step (S402) is not necessary, the rest of the method being perfectly applicable. The propagation is simply deactivated and the T-joints are conserved.

Figure 12:
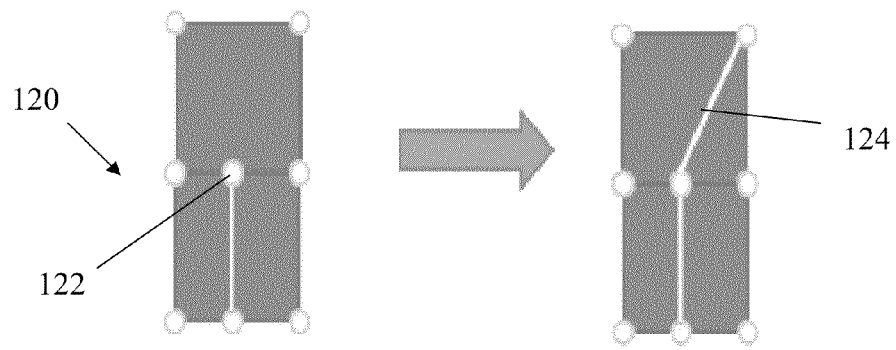
Figure 13:
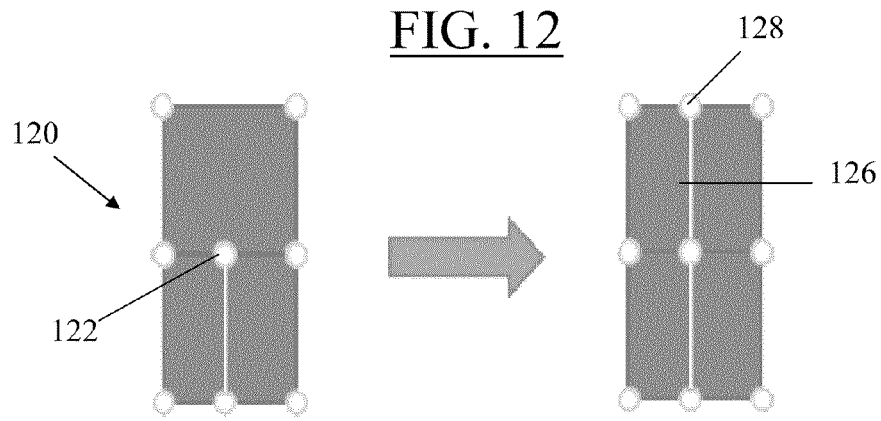

FIGS. 12 and 13 illustrate examples of the adding (S402). In both figures, the mesh 120 has a T-joint 122. In the case of FIG. 12, T-joint 122 is eliminated by adding an edge 124, whereas in the case of FIG. 13, T-joint 122 is eliminated by adding an edge 126 and a vertex 128.

In the method of the example, determining (S40) the mesh also comprises adding (S403) arcs and/or nodes to the graph according to a mesh subdivision scheme. The mesh subdivision scheme may be any known mesh subdivision scheme, for example the Catmull-Clark subdivision scheme. This allows a refinement of the mesh and to obtain a regular number of edges per face. This smoothes the mesh in expectation of the fitting (S50) with the surface, thereby resulting in a smoother surface.

The case where the crossings include at least one crossing between a respective pair of the curves determined as a pair of points, each belonging to a different one of the respective pair of the curves, is now discussed. In other words, this is the case where the curves do not intersect perfectly each other but are meant to intersect each other. In such a case, determining (S40) the mesh may comprise, as it is the case on the example of FIG. 4, associating (S406) to the node representing the at least one crossing the 3D position of the middle of the pair of points. Indeed, in order to fit (S50) the mesh with a surface, the method may associate (S406, S407) 3D positions to the vertices of the mesh beforehand. For a vertex representing a crossing, the middle of the two points forming the crossing may be used by the method. Of course, for a crossing that is a perfect intersection (which, in an example, may never occur), the position of the intersection may be used.

For the other vertices of the mesh (in case determining (S40) the mesh comprises adding nodes to the graph (S401, S402, S403)), the method may comprise associating (S407), to a given added node, a 3D position which depends on the topological position of the given node relative to the graph before adding nodes. For example, the 3D position associated to a given added node may be, if the topological position of the given added node is on an arc of the graph before adding nodes, a position computed by offsetting the curve represented by the arc according to the 3D positions associated to the nodes at the extremities of the arc.

Figure 14:
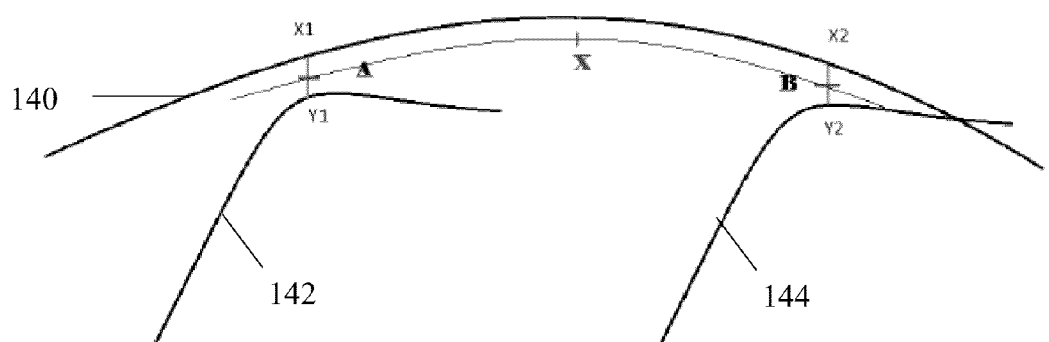

This case is illustrated on FIG. 14. With reference to FIG. 14, three curves 140, 142, and 144 are represented. A crossing (x1, y1) between curve 140 and curve 142, and a crossing (x2, y2) between curve 140 and curve 144 have been determined. These crossings correspond to respective final vertices in the mesh, noted A and B, and to which the middle position of respectively x1 and y1 and then x2 and y2 is associated. In this example, the method has added vertice X to the mesh. Vertice X topologically belongs to curve 140. The 3D position associated to vertice X, in this case, is computed by offsetting curve 140 so that it passes by the 3D position of A and B, and evaluating the position on the offset curve corresponding to the topological position of X on the curve (the latter being provided by the way that X was added to the mesh).

If the topological position of the given added node is on the interior of a tile of the graph before adding nodes to the graph which is four-sided, the 3D position associated to the given added node may be a position computed by the well-known Coons method. In any other case, the 3D position associated to the given added node may be computed by averaging 3D positions of neighbors. In the latter case, the averaging may be repeated, the computed 3D positions being each time refined, in order to obtain a smoother result to obtain convergence to the intended result.

As the one skilled in the art will understand, the method may thus keep track of which base tile each vertex belongs to. Moreover, in the case of a four-sided tile, the (u, v) coordinates (always updated when a tile is split) may also be kept in memory.

The invention claimed is:

1. A computer-implemented method for creating a surface from a plurality of 3D curves, wherein the method comprises:
    providing a plurality of 3D curves;
    determining first crossings between pairs of the 3D curves, including determining at least one crossing between a respective pair of the 3D curves as a pair of points, each belonging to a different one of the respective pair of the 3D curves, by:
        projecting the plurality of 3D curves on a support, thereby obtaining a plurality of corresponding projected curves,
        determining second crossings between pairs of the projected curves, and
        retrieving the pairs of points of the 3D curves corresponding to the second crossings between pairs of the projected curves;
    defining a base graph comprising nodes representing the first crossings and arcs connecting pairs of nodes representing first crossings that are neighbors;
    determining, from the graph, a mesh comprising vertices defined by a 3D position and edges connecting pairs of the vertices; and
    fitting the mesh with a surface.

2. The method of claim 1, wherein:
    projecting the plurality of 3D curves on the support comprises discretizing the plurality of 3D curves into polylines comprising a set of segments, and, projecting the segments on the support, thereby obtaining a plurality of corresponding projected segments; and determining second crossings between pairs of the projected curves comprises determining pairs of the projected segments corresponding to different projected curves belonging to a same voxel, determining bi-perpendiculars between the determined pairs of projected segments, and, determining the extremities of the bi-perpendiculars.

3. The method as claimed in claim 1, wherein determining the mesh comprises adding arcs and/or nodes to the graph, until all tiles of the graph are divided into faces having three or four arcs.

4. The method as claimed in claim 1, wherein determining the mesh comprises adding arcs and/or nodes to the graph, until no T-joint remains.

5. The method as claimed in claim 1, wherein determining the mesh comprises adding arcs and/or nodes to the graph according to a mesh subdivision scheme.

6. The method as claimed in claim 1, wherein the first crossings include at least one crossing between a respective pair of the 3D curves determined as a pair of points, each belonging to a different one of the respective pair of the 3D curves, and wherein determining the mesh comprises associating to the node representing the at least one first crossing the 3D position of the middle of the pair of points.

7. The method of claim 6, wherein determining the mesh comprises adding nodes to the graph, and associating, to a given added node, a 3D position which depends on the topological position of the given node relative to the graph before adding nodes.

8. The method of claim 7, wherein the 3D position associated to a given added node is:
if the topological position of the given added node is on an arc of the graph before adding nodes, a position computed by offsetting the curve represented by the arc according to the 3D positions associated to the nodes at the extremities of the arc, or
if the topological position of the node is on the interior of a tile of the graph before adding nodes to the graph which is four-sided, a position computed by the Coons method, or
in any other case, a position computed by averaging 3D positions of neighbors.

9. The method as claimed in claim 1, wherein the plurality of 3D curves comprises curves that are sketched free-hand.

10. A CAD system comprising:
at least one memory having recorded thereon instructions for performing a computer-implemented method;
at least one processor coupled with the memory; and
at least one graphical user interface coupled with the processor and suitable for execution of the instructions,
wherein the computer-implemented method is for creating a surface from a plurality of 3D curves and comprises:
providing a plurality of 3D curves;
determining first crossings between pairs of the 3D curves, including determining at least one crossing between a respective pair of the 3D curves as a pair of points, each belonging to a different one of the respective pair of the 3D curves, by:
projecting the plurality of 3D curves on a support, thereby obtaining a plurality of corresponding projected curves,
determining second crossings between pairs of the projected curves, and
retrieving the pairs of points of the 3D curves corresponding to the second crossings between pairs of the projected curves;
defining a base graph comprising nodes representing the first crossings and arcs connecting pairs of nodes representing first crossings that are neighbors;
determining, from the graph, a mesh comprising vertices defined by a 3D position and edges connecting pairs of the vertices; and
fitting the mesh with a surface.

11. A non-transitory computer readable medium with an executable program stored thereon and executable by a processor, the program comprising instructions for the processor to perform the following steps:
providing a plurality of 3D curves;
determining first crossings between pairs of the 3D curves, including determining at least one crossing between a respective pair of the 3D curves as a pair of points, each belonging to a different one of the respective pair of the 3D curves, by:
projecting the plurality of 3D curves on a support, thereby obtaining a plurality of corresponding projected curves,
determining second crossings between pairs of the projected curves, and
retrieving the pairs of points of the 3D curves corresponding to the second crossings between pairs of the projected curves;
defining a base graph comprising nodes representing the first crossings and arcs connecting pairs of nodes representing first crossings that are neighbors;
determining, from the graph, a mesh comprising vertices defined by a 3D position and edges connecting pairs of the vertices; and
fitting the mesh with a surface.

* * * * *